(12) United States Patent
Hasuda

(10) Patent No.: US 7,822,330 B2
(45) Date of Patent: Oct. 26, 2010

(54) IMAGE BLUR CORRECTION DEVICE AND CAMERA

(75) Inventor: Masanori Hasuda, Fujisawa (JP)

(73) Assignee: Nikon Corporation, Tokyo (JP)

( * ) Notice: Subject to any disclaimer, the term of this patent is extended or adjusted under 35 U.S.C. 154(b) by 341 days.

(21) Appl. No.: 12/084,887

(22) PCT Filed: Nov. 13, 2006

(86) PCT No.: PCT/JP2006/322574

§ 371 (c)(1),
(2), (4) Date: May 12, 2008

(87) PCT Pub. No.: WO2007/055356

PCT Pub. Date: May 18, 2007

(65) Prior Publication Data

US 2009/0252484 A1    Oct. 8, 2009

(30) Foreign Application Priority Data

Nov. 14, 2005   (JP) .............................. 2005-328607

(51) Int. Cl.
*G03B 17/00*   (2006.01)
*H04N 5/228*   (2006.01)
(52) U.S. Cl. .................................... 396/55; 348/208.99
(58) Field of Classification Search ............... 396/55; 348/208.99
See application file for complete search history.

(56) References Cited

U.S. PATENT DOCUMENTS 5,117,246 A    5/1992   Takahashi et al.
5,266,988 A    11/1993  Washisu
5,940,631 A    8/1999   Hirano et al.
2001/0007612 A1   7/2001   Wada et al.
2001/0030275 A1   10/2001  Tsukamoto et al.
2003/0044175 A1   3/2003   Enomoto
2006/0127073 A1*  6/2006   Yasuda .................. 396/55
2006/0176373 A1   8/2006   Ito et al.

FOREIGN PATENT DOCUMENTS

| JP | A 11-109432   | 4/1999  |
|----|---------------|---------|
| JP | A 2001-201777 | 7/2001  |
| JP | A 2001-305434 | 10/2001 |
| JP | A 2003-075881 | 3/2003  |
| JP | A 2003-255422 | 9/2003  |
| JP | A 2005-084655 | 3/2005  |
| JP | A 2005-352125 | 12/2005 |
| JP | A 2006-243701 | 9/2006  |

* cited by examiner

*Primary Examiner*—Rodney E Fuller
(74) *Attorney, Agent, or Firm*—Oliff & Berridge, PLC

(57) ABSTRACT

An image blur correction device includes: a blur correction optical system that corrects for image blur by moving in first and second directions on a plane that is orthogonal to an optical axis; a first actuator that drives the blur correction optical system in the first direction; a second actuator that drives the blur correction optical system in a second direction that is approximately orthogonal to the first direction; and a position measurement device that measures move amount of the blur correction optical system; and in the image blur correction device, the blur correction optical system, the first actuator, the second actuator and the position measurement device are arranged in series approximately along an imaginary straight line that is parallel to the first direction.

15 Claims, 3 Drawing Sheets

(a)

(b)

(a)

(b)

IMAGE BLUR CORRECTION DEVICE AND CAMERA

TECHNICAL FIELD

The present invention relates to an image blur correction device that is used in a photographic device such as a camera or the like and that is capable of correcting image blur, and to a camera that incorporates such an image blur correction device.

BACKGROUND ART

A lens barrel that is capable of correcting image blur and that incorporates a blur correction device is per se known, as for example described in Patent Reference #1.

In the blur correction device described in Patent Reference #1, two groups are provided, each consisting of an actuator and a position detection sensor that are arranged on opposite sides of the blur correction lens, and these groups of an actuator and a position detection sensor are arranged at positions rotated apart by 90° around the optical axis as a center. Accordingly, in the blur correction device described in Patent Document #1, the actuators and the position detection sensors come to be arranged nearly all around the blur correction lens, so that the blur correction unit becomes approximately cylindrical in shape. Due to this, there is the problem that the thickness of the lens barrel in the directions orthogonal to the optical axis of the blur correction lens becomes great (i.e. that the diameter of the lens barrel becomes large), and this is undesirable.

Patent Reference #1: Japanese Laid-Open Patent Publication Heisei 11-109432.

DISCLOSURE OF THE INVENTION

Problems to be Solved by the Invention

An image blur correction device according to the first aspect of the present invention comprises: a blur correction optical system that corrects for image blur by moving in first and second directions on a plane that is orthogonal to an optical axis; a first actuator that drives the blur correction optical system in the first direction; a second actuator that drives the blur correction optical system in a second direction that is approximately orthogonal to the first direction; and a position measurement device that measures the move amount of the blur correction optical system; and in the image blur correction device, the blur correction optical system, the first actuator, the second actuator and the position measurement device are arranged in series approximately along an imaginary straight line that is parallel to the first direction.

According to the second aspect of the present invention, it is preferable that the image blur correction device according to the first aspect further comprises: a movable member that holds the blur correction optical system on the plane orthogonal to the optical axis; and in the image blur correction device, at least a part of members included in the first actuator, a part of members included in the second actuator and a part of members included in the position measurement device are disposed on/in the movable member.

According to the third aspect of the present invention, it is preferable that the image blur correction device according to the second aspect further comprises: a support mechanism that supports the movable member to be movable on the plane orthogonal to the optical axis; a guide shaft that is provided to the support mechanism or the movable member approximately upon the imaginary straight line, and that is parallel to the optical axis; and a guide hole that is provided to the support mechanism or the movable member approximately upon the imaginary straight line, that is a long slot extending along a direction parallel to the imaginary straight line, and into which the guide shaft fits, and in this image blur correction device one of the guide shaft and the guide hole is provided to the support mechanism and the other is provided to the movable member, and the movable member moves linearly along a length direction of the guide hole under the guidance of the guide shaft and moves rotationally on the plane orthogonal to the optical axis about the guide shaft as a center.

According to the forth aspect of the invention, it is preferable that in the image correction device according to the third aspect, the guide shaft and the guide hole are provided upon the opposite side of the first actuator, the second actuator and the position measurement device, and the blur correction optical system is disposed between the guide shaft and the guide hole, and the first actuator, the second actuator and the position measurement device.

According to the fifth aspect of the invention, it is preferable that in the image blur correction device according to the third or forth aspect, the second actuator is disposed at a position that is further from the blur correction optical system than a position of the first actuator.

According to the sixth aspect of the invention, it is preferable that in the image blur correction device according to any one of the third through fifth aspect, the position measurement device is disposed at a position that is further from the blur correction optical system than a position of the first actuator and the second actuator.

According to the seventh aspect of the invention, it is preferable that in the image blur correction device according to any one of the second through sixth aspect, the first actuator and the second actuator are configured to voice coil motors including magnets, yokes, and coils; and the coils are disposed upon the movable member.

According to the eighth aspect of the invention, the image blur correction device according to the second aspect may further comprise: a support mechanism that supports the movable member movably on a plane orthogonal to the optical axis; and spring members that are provided between the movable member and the support mechanism, and that bias the movable member in the direction of extension of the imaginary straight line.

According to the ninth aspect of the invention, it is preferred that in the image blur correction device according to the eighth aspect, the spring members are provided at both end portions of the movable member approximately upon the imaginary straight line, and bias the movable member in mutually opposite directions.

According to the tenth aspect of the invention, it is preferred that in the image blur correction device according to the ninth aspect, the blur correction optical system is disposed at a position between the first actuator and the second actuator.

According to the eleventh aspect of the invention, it is preferred that in the image blur correction device according to the tenth aspect, the position measurement unit is disposed at a position that is closer to the second actuator than the first actuator.

According to the twelfth aspect of the invention, it is preferred that in the image blur correction device according to any one of the third through eleventh aspect, the support mechanism comprises an optical axis direction regulation member that regulates the position of the moveable member in the direction of the optical axis, and supports the movable member movably on the plane.

According to the thirteenth aspect of the invention, it is preferred that in the image blur correction device according to any one of the first through twelfth aspect, the blur correction optical system and a bent optical system that is provided in front of the blur correction optical system and that bents light incident from a photographic subject once constitute a photographic optical system.

According to the fourteenth aspect of the invention, it is preferred that in the image blur correction device according to the thirteenth aspect, the optical axis of the blur correction optical system is approximately orthogonal to the optical axis of an objective lens group; and the direction of the imaginary straight line is approximately orthogonal to the optical axis of the objective lens group.

A camera according to the fifteenth aspect of the invention comprises: an image blur correction device according to any one of the first through fourteenth aspect; and an image sensor that captures an image of a photographic subject that has passed through the blur correction optical system.

ADVANTAGEOUS EFFECT OF THE INVENTION

According to the present invention, since the various elements that make up the image blur correction device are arranged along a single straight line, it is possible to build the image blur correction device in a slender (long and thin) shape. Therefore, the thickness of the camera in one direction orthogonal to the optical axis can be reduced.

BEST MODE FOR CARRYING OUT THE INVENTION

The First Embodiment

Figure 1:
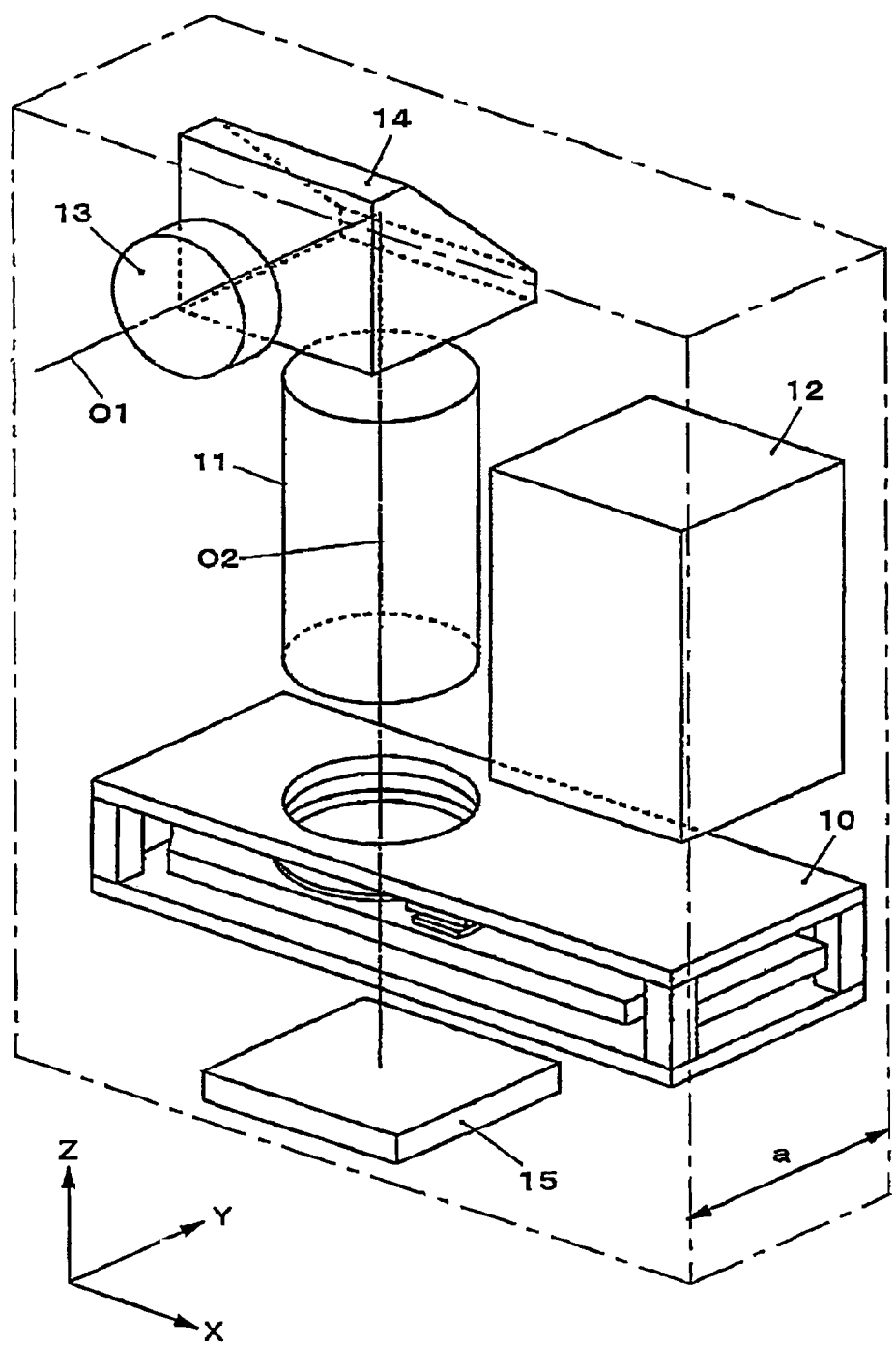
FIG. 1 is a figure showing the main structure of a camera that includes an image blur correction device according to a first embodiment of the present invention.

FIG. 1 is a figure showing the main structure of a camera that includes an image blur correction device according to a first embodiment of the present invention.

This camera according to the first embodiment includes a lens barrel that includes an objective lens group 13, a deflection prism 14, a zoom focusing lens group 11 and an image blur correction device 10, an image sensor 15 and a lens drive unit 12. It should be understood that the rectangular parallelepiped shown by the single dotted broken lines in FIG. 1 indicates the external shape of the camera.

The optical axis O1 of the objective lens group 13 is bent round at an angle of 90° by the deflection prism 14, thus becoming the optical axis O2 of the zoom focusing lens group 11 that is orthogonal to the optical axis O1. In other words, the light from the photographic subject that is incident upon the objective lens group 13 is bent around by the deflection prism 14 and arrives at the zoom focusing lens group 11. And, after having passed through the zoom focusing lens group 11, this light from the photographic subject arrives at the image sensor 15 via a blur correction lens 2 of the image blur correction device 10, which will be described hereinafter. The lens drive unit 12 is a unit that drives the zoom focusing lens group 11 so as to perform zooming operation and focusing operation.

Here, for explanation, the X-Y-Z coordinate system shown in FIG. 1 is established. The optical axis O1 is parallel to the Y axis, and the optical axis O2 is parallel to the Z axis.

Figure 2:
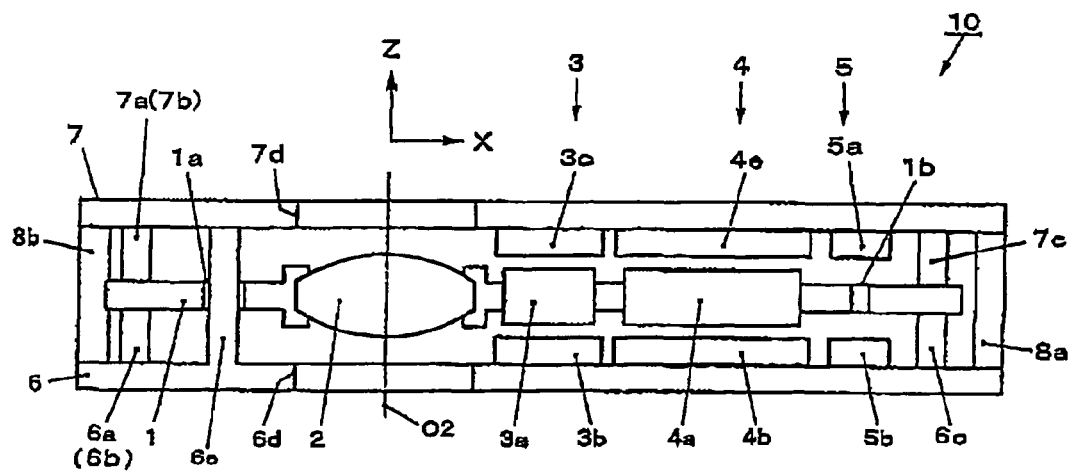
FIG. 2 is a figure showing two views of this image blur correction device according to the first embodiment.
Figure 2:
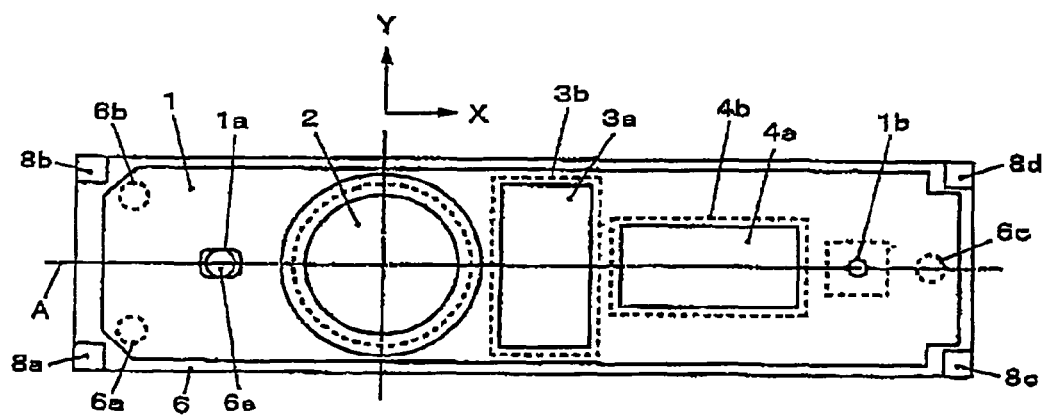

FIG. 2 shows the image blur correction device 10. FIG. 2(a) is a sectional view taken in an X-Z plane, and FIG. 2(b) is a figure showing the device in its state with a second frame 7 removed, as seen along the Z-axis direction.

This image blur correction device 10 includes a movable member 1, a blur correction lens 2, a VCM (Voice Coil Motor) 3 for X drive, a VCM 4 for Y drive, a position detection sensor 5, a first frame 6, the abovementioned second frame 7, and struts 8a, 8b, 8c, and 8d.

The blur correction lens 2 is an optical system for blur correction that corrects for an image blur by moving along the X direction and the Y direction on a plane that is orthogonal to the optical axis O2, and is held upon the movable member 1. This movable member 1 is an approximately plate shaped member that holds the blur correction lens 2 so that it is movable along the X direction and the Y direction on the aforementioned plane that is orthogonal to the optical axis O2. A slot shaped guide hole 1a and a circular shaped position detection hole 1b are provided in the movable member 1. The guide hole 1a is a long slot extending along a imaginary straight line A that will be described hereinafter, parallel to the X direction. Since a guide shaft 6e of circular cross section that will be described hereinafter is fitted into this guide hole 1a, the blur correction lens 2 supported by this movable member 11 can at least be shifted along the X direction while being guided by the guide hole 1a. The position detection hole 1b is a circular hole that opens upon the imaginary straight line A, so that detection light from the position detection sensor 5 can pass through it for measuring the move amount of the blur correction lens 2, as will be described hereinafter.

The VCM 3 for X drive is a first actuator that generates a drive force for driving the movable member 1 in the X direction (i.e. in a first direction) along with the blur control lens 2. In concrete terms, this VCM 3 for X drive is a voice coil motor that includes a coil 3a, a magnet 3b, and a yoke 3c. The coil 3a is provided to the movable member 1, and is disposed between the magnet 3b provided to the first frame 6, and the yoke 3c provided to the second frame 7. It should be understood that, although actually wiring is required for conducting electricity to the coil 3a, this wiring is not shown in FIG. 2.

The VCM 4 for Y drive is a second actuator that generates a drive force in the Y direction (i.e. in a second direction) that is approximately orthogonal to the X direction, so as to rotate the movable member 1 around the guide shaft 6e along with the blur correction lens 2. In concrete terms, this VCM 4 for Y drive is a voice coil motor that includes a coil 4a, a magnet 4b, and a yoke 4c. The coil 4a is provided to the movable member 1, and is disposed between the magnet 4b provided to the first frame 6, and the yoke 4c provided to the second frame 7. It should be understood that, although actually wiring is required for conducting electricity to the coil 4a, this wiring is not shown in FIG. 2.

The position detection sensor 5 is a position measurement device that measures the move amount of the blur correction lens 2. In concrete terms, the position detection sensor 5 includes a LED (Light Emitting Diode) 5a provided to the second frame 7, a two-dimensional PSD (Position Sensitive Detector) 5b provided to the first frame 6, and the position detection hole 1b provided in the movable member 1. The light generated by the LED 5a passes through the position detection hole 1b in the movable member 1 and forms a light spot upon the two-dimensional PSD 5b. The position of the movable member 1 is detected based upon the position of this light spot, and thereby the two-dimensional optical axis deviation (i.e. the displacement) of the blur correction lens 2 that is provided to the movable member 1 is detected.

By being held together a predetermined distance apart by the struts 8a, 8b, 8c, and 8b, the flat plate shaped first frame 6 and the flat plate shaped second frame 7 are combined together into a support structure that movably supports the movable member 1. The guide shaft 6e and support portions 6a, 6b, and 6c that support the movable member 1 are formed upon the first frame 6. Support portions 7a, 7b, and 7c that support the movable member 1 are formed upon the second frame 7. These support portions 6a and 7a, 6b and 7b, and 6c and 7c constitute Z direction position regulation members for the movable member 1. The support portions 6a through 6c on the first frame 6 and the support portions 7a through 7c on the second frame 7 are arranged in positions that respectively mutually oppose one another with slightly larger gaps than the thickness of the movable member 1, and the movable member 1 is disposed between the support portion 6a through 6c and the support portion 7a through 7c. Accordingly, the movable member 1 is supported so as to be movable on the X-Y plane while its position in the Z direction is regulated.

Next, the operation of the image blur correction device 10 according to this first embodiment will be explained.

When photography is started, the blur correction lens 2 is driven in the X and Y directions by the VCM 3 for X drive and the VCM 4 for Y drive, so as to cancel out any vibration due to camera vibration that has been detected by a vibration detection sensor not shown in the figures. With regard to the X direction, the blur correction lens 2 is driven by the VCM 3 for X drive. At this time, the direction of moving of the movable member 1 with respect to the guide shaft 6e is regulated by the shape of the guide hole 1a, so that the blur correction lens 2 moves linearly along the longitudinal direction of the guide hole 1a, i.e. the X direction.

With regard to the Y direction, the blur correction lens 2 that is mounted upon the movable member 1 is driven by the VCM 4 for Y drive. The movable member 1, in other words the blur correction lens 2, pivots around the guide shaft 6e as a center.

The move amounts of the blur correction lens 2 in the X and Y directions are detected by the two dimensional PSD 5b. And these move amounts of the blur correction lens 2 in the X and Y directions obtained from the two dimensional PSD 5b are converted into move amounts of the blur correction lens 2. The position of the blur correction lens 2 is controlled by feeding back these converted move amounts, so that the image blur in the X and Y directions is corrected. In other words, along with the VCM 3 for X drive being feedback controlled according to the X direction position signal detected by the two dimensional PSD 5b, also the VCM 4 for Y drive is feedback controlled according to its Y direction position signal. It should be understood that the move amount of the blur correction lens 2 in the Y direction is calculated based upon the proportion of the distance from the guide shaft 6e to the position detection hole 1b to the distance from the guide shaft 6e to the optical axis of the blur correction lens 2.

With this image blur correction device 1 according to the first embodiment of the present invention as explained above, the following advantageous operational effects are obtained.

(1) All of the guide hole 1a, the blur correction lens 2, the VCM 3 for X drive, the VCM 4 for Y drive, and the position detection sensor 5 are arranged in a series configuration approximately linearly along the imaginary straight line A orthogonal to the optical axis O2 and parallel to the X direction. Thus, since the image blur correction device 10 is extremely thin and has a very slender shape in one direction (the Y direction) orthogonal to the optical axis, it becomes possible to make the thickness of the camera that incorporates this folded type optical system (i.e. its dimension a in FIG. 1) extremely small.

(2) In the X direction, it is arranged for the guide hole 1a to be provided on the opposite side of the position detection sensor 5, the VCM 3 for X drive, and the VCM 4 for Y drive, and for the blur correction lens 2 to be provided between the guide hole 1a, and the position detection sensor 5, the VCM 3 for X drive and the VCM 4 for Y drive. Since the movable member 1 performs rotational movement around the guide shaft 6e due to the drive force of the VCM 4 for Y drive, the further the position is from the guide shaft 6e, the greater is the move amount for a given rotational angle. In other words, the further the position of the VCM 4 for Y drive becomes remote from the guide hole 1a, the greater the drive amount of the VCM 4 for Y drive becomes. Accordingly, by providing the configuration described above, the accuracy of driving of the movable member 1 by the VCM 4 for Y drive is enhanced, since the control is simpler than if it were necessary to drive the VCM 4 for Y drive very minutely.

(3) It is arranged for the VCM 4 for Y drive to be disposed in a position that is more remote from the blur correction lens 2 than the VCM 3 for X drive in the X direction. Accordingly, in a similar manner to (2) described above, the accuracy of driving of the movable member 1 by the VCM 4 for Y drive is enhanced.

(4) It is arranged for the position sensor 5 to be disposed in a position that is more remote from the blur correction lens 2 than the VCM 3 for X drive and the VCM 4 for Y drive in the X direction. As described above, since the movable member 1 performs rotational movement about the guide shaft 6e as a center, the further is the position from the guide hole 1a, the greater the move amount for a given rotational angle becomes. In other words, the further the position detection sensor 5 is remote from the guide hole 1a, the more finely is it possible for the position detection sensor 5 to measure the move amount of the movable member 1; and accordingly position detection can also be performed at high accuracy.

(5) Under the guidance of the guide shaft 6e, it is arranged for the movable member 1 to move linearly in the X direction along the longitudinal direction of the guide hole 1a, and to rotationally move on the plane orthogonal to the optical axis O2 around the guide shaft 6e as a center. The blur correction optical system 2 corrects the image blur by performing linear moving and rotational moving along with linear moving and rotational moving of the movable member 1. In other words, due to the shape of the guide hole 1a and the guide shaft 6e, it is possible for the blur correction optical system 2 to perform linear moving and rotational moving on the plane that is orthogonal to the optical axis O2. Thus, since it is not necessary to provide any mechanism for linearly shifting the blur correction optical system 2 apart from the mechanism to rotationally shift it, it becomes possible to make the image blur correction device 10 more compact.

The Second Embodiment

Figure 3:
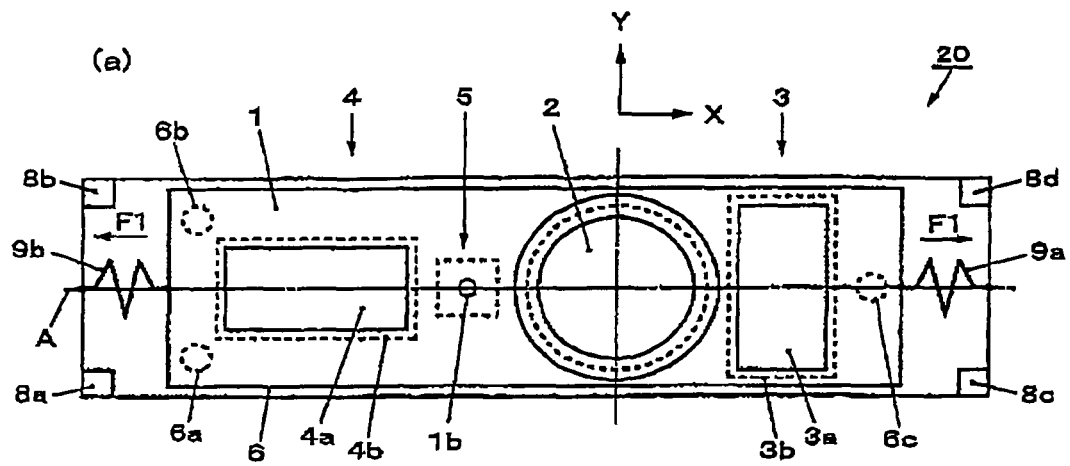
FIG. 3 is a figure showing two views of an image blur correction device according to a second embodiment of the present invention.
Figure 3:
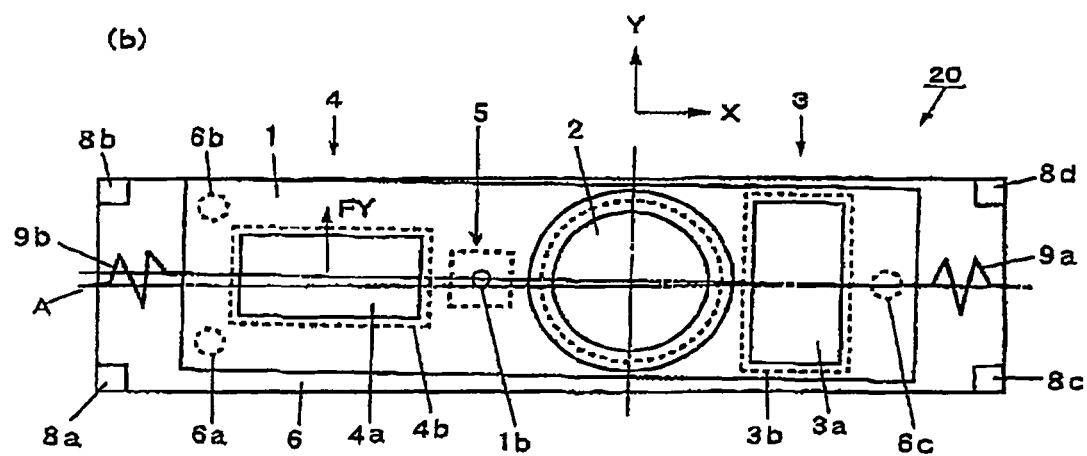

FIG. 3 is a figure showing an image blur correction device 20 according to a second embodiment of the present invention. It should be understood that FIGS. 3(a) and 3(b) are figures showing the state of this mechanism as seen from the Z axis direction in the state with the second frame 7 removed, similarly to FIG. 2(b) for the first embodiment.

This second embodiment is an example in which the method of guiding the movable member 1 in the previously described first embodiment is changed, and also the arrangement of various elements is changed. Accordingly, the same reference symbols are appended to portions that fulfill similar functions to ones in the first embodiment, and duplicated explanation will be omitted.

In this second embodiment, the position of the movable member 1 on the X-Y plane is stabilized by pulling it in the ±X directions with spring members 9a and 9b that are provided between the movable member 1 and the support mechanism. The spring member 9a pulls the movable member 1 with a force F1 in the +X direction, and the spring member 9b pulls the movable member 1 with the same force F1 in the –X direction. As a result, the movable member 1 is held in an equilibrium along the X direction.

As in the first embodiment, all of the blur correction lens 2, the VCM 3 for X drive, the VCM 4 for Y drive, and the position detection sensor 5 are arranged in series approximately linearly upon the imaginary straight line A that is orthogonal to the optical axis O2 and is parallel to the X direction. By employing this type of configuration, it is possible to make this image blur correction device 20 according to the second embodiment in a slender shape whose width in one direction orthogonal to the optical axis (i.e. in the Y direction) is extremely thin.

The spring members 9a and 9b are provided at both end portions of the movable member 1 on the imaginary straight line A, and bias the movable member 1 in mutually opposite directions. Moreover, the blur correction lens 2 is disposed at a position between the VCM 3 for X drive and the VCM 4 for Y drive in the X direction. Accordingly, the balance between the weight of the image blur correction device 20 and the way in which its drive force operates is good, and the drive controllability of the blur correction lens 2 becomes good.

The position detection sensor 5 is arranged at a position that is closer to the VCM 4 for Y drive than to the VCM 3 for X drive in the X direction. When the movable member 1 is driven in the Y direction by the VCM 4 for Y drive with a force FY, due to the VCM 4 for Y drive disposed at closer side to the spring member 9b in the X direction, the movable member 1 is rotated as shown in FIG. 3(b). Thus, since the position detection sensor 5 measures the move amount of the movable member 1 at a position where the move amount in the Y direction is large, it is possible to perform position detection at a higher accuracy than if the position detection sensor 5 were to be arranged at a position close to the VCM 3 for X drive. It should be understood that, since the movable member 1 is shifted by the VCM 3 for X drive approximately in the X direction, there is almost no influence upon the accuracy of position detection with regard to the X direction due to the position in which the position detection sensor 5 is disposed.

According to this second embodiment, it is possible to make the width in one direction that is orthogonal to the optical axis (i.e. in the Y direction) extremely thin. Moreover, it is arranged to stabilize the position of the movable member on the X-Y plane by pulling the movable member 1 with the spring members 9a and 9b. Accordingly, it is possible to support the movable member 1 with no play, even the VCM 3 for X drive and the VCM 4 for Y drive are not being driven.

Variant Embodiments

The present invention is not to be considered as being limited to the embodiments described above, various alterations and changes may be made.

In these embodiments, examples were shown of image blur correction devices having bent type optical systems in which the optical axes of the photographic optical systems were bent once. However, this is not limitative; for example, the present invention could be applied to an image blur correction device having a normal photographic optical system in which the optical axis was not bent, or to an image blur correction device in which the optical axis was bent a plurality of times.

Although in these embodiments the image blur correction devices 10 and 20 were arranged on the side closest to the image sensor 15, depending upon the design of the optical system, it may also become necessary, for example, to arrange the blur correction lens 2 within the zoom focusing lens group 11, or in front of it (i.e. towards the side of the photographic subject). In these cases as well, it is possible to build the image blur correction device according to the present invention, and in a similar manner it is possible to make the camera very thin.

Although in these embodiments examples were shown in which the position detection sensor 5 uses a sensor that was capable of detecting two-dimensional deviation of the optical axis of the blur correction lens 2, this is not limitative; a structure would also be acceptable in which sensors that were capable of position detection in one dimension were used to perform position detection in the two orthogonal X and Y axial directions.

It should be understood that, although various embodiments and variant embodiments of the present invention have been disclosed, the present invention is not to be considered as being limited to these embodiments; various other possibilities that may be considered to come within the range of the technical concept of the present intention are also included within its scope.

The contents of the disclosure of the following patent application, upon which priority is claimed, is hereby incorporated by reference:

Japanese Patent Application NO. 2005-328607 (filed Nov. 14, 2005).

The invention claimed is:

1. An image blur correction device, comprising:
    a blur correction optical system that corrects for image blur by moving in first and second directions on a plane that is orthogonal to an optical axis;
    a first actuator that drives the blur correction optical system in the first direction;
    a second actuator that drives the blur correction optical system in a second direction that is approximately orthogonal to the first direction; and
    a position measurement device that measures move amount of the blur correction optical system; wherein
    the blur correction optical system, the first actuator, the second actuator and the position measurement device are arranged in series approximately along an imaginary straight line that is parallel to the first direction.

2. An image blur correction device according to claim 1, further comprising:
    a movable member that holds the blur correction optical system on the plane orthogonal to the optical axis; and wherein
    at least a part of members included in the first actuator, a part of members included in the second actuator and a part of members included in the position measurement device are disposed on/in the movable member.

3. An image blur correction device according to claim 2, further comprising:
    a support mechanism that supports the movable member to be movable on the plane orthogonal to the optical axis;

a guide shaft that is provided to the support mechanism or the movable member approximately upon the imaginary straight line, and that is parallel to the optical axis; and a guide hole that is provided to the support mechanism or the movable member approximately upon the imaginary straight line, and that is parallel to the optical axis; and a guide hole that is provided to the support mechanism of the movable member approximately upon the imaginary straight line, that is a long shot extending along a direction parallel to the imaginary straight line, and into which the guide shaft fits; wherein one of the guide shaft and the guide hole is provided to the support mechanism and the other is provided to the movable member, and the movable member moves linearly along a length direction of the guide hold under the guidance of the guide shaft and moves rotationally on the plane orthogonal to the optical axis about the guide shaft as a center.

4. An image blur correction device according to claim 3, wherein:

the guide shaft and the guide hole are provided upon the opposite side of the first actuator, the second actuator and the position measurement device, the blur correction optical system being disposed between the guide shaft and the guide hole, and the first actuator, the second actuator and the position measurement device.

5. An image blur correction device according to claim 3, wherein:

the second actuator is disposed at a position that is further from the blur correction optical system than a position of the first actuator.

6. An image blur correction device according to claim 3, wherein:

the position measurement device is disposed at a position that is further from the blur correction optical system that a position of the first actuator and the second actuator.

7. An image blur correction device according to claim 3, wherein:

the support mechanism comprises an optical axis direction regulation member that regulates the position of the movable member in the direction of the optical axis, and supports the movable member movably on the plane.

8. An image blur correction device according to claim 2, wherein:

the first actuator and the second actuator are configured to voice coil motors including magnets, yokes, and coils; and the coils are disposed upon the movable member.

9. An image blur correction device according to claim 2, further comprising:

a support mechanism that supports the movable member movably on a plane orthogonal to the optical axis; and spring members that are provided between the movable member and the support mechanism, and that bias the movable member in the direction of extension of the imaginary straight line.

10. An image blur correction device according to claim 9, wherein:

the spring members are provided at both end portions of the movable member approximately upon the imaginary straight line, and the bias the movable member in mutually opposite directions.

11. An image blur correction device according to claim 10, wherein:

the blur correction optical system is disposed at a position between the first actuator and the second actuator.

12. An image blur correction device according to claim 11, wherein:

the position measurement unit is disposed at a position that is closer to the second actuator than the first actuator.

13. An image blur correction device according to claim 1, wherein:

the blur correction optical system and a bent optical system that is provided in front of the blur correction optical system and that bents light incident from a photographic subject once constitute a photographic optical system.

14. An image blur correction device according to claim 13, wherein:

the optical axis of the blur correction optical system is approximately orthogonal to the optical axis of an objective lens group; and the direction of the imaginary straight line is approximately orthogonal to the optical axis of the objective lens group.

15. A camera, comprising:

an image blur correction device according to claim 1; and an image sensor that captures an image of a photographic subject that has passed through the blur correction optical system.

* * * * *